US005672938A

United States Patent [19]

Jones

[11] Patent Number: 5,672,938

[45] Date of Patent: Sep. 30, 1997

[54] LIGHT EMISSION DEVICE COMPRISING LIGHT EMITTING ORGANIC MATERIAL AND ELECTRON INJECTION ENHANCEMENT STRUCTURE

[75] Inventor: Gary W. Jones, Lagrangville, N.Y.

[73] Assignee: Fed Corporation, Hopewell Junction, N.Y.

[21] Appl. No.: 723,222

[22] Filed: Sep. 27, 1996

Related U.S. Application Data

[60] Provisional application No. 60/004,560, Sep. 29, 1995.

[51] Int. Cl.$^6$ .............................. H01J 33/14; B32B 9/00

[52] U.S. Cl. .......................... 313/504; 313/505; 313/506; 313/336; 313/351; 313/309; 428/690; 428/917; 315/169.3

[58] Field of Search .................................. 313/506, 504, 313/505, 500, 501, 502, 503, 309, 336, 351; 428/690, 917; 315/169.3, 169.4

[56] References Cited

U.S. PATENT DOCUMENTS

| | | | |
|---|---|---|---|
| 3,160,541 | 12/1964 | Wollentin | 313/503 X |
| 3,172,862 | 3/1965 | Gurnee et al. | 313/503 X |
| 4,940,916 | 7/1990 | Borel et al. | 313/336 X |
| 4,987,339 | 1/1991 | Robertson | 313/506 X |
| 5,153,073 | 10/1992 | Ognuma et al. | 428/917 X |
| 5,347,489 | 9/1994 | Imai et al. | 428/690 |
| 5,405,709 | 4/1995 | Littman et al. | 428/690 |

OTHER PUBLICATIONS

"Microcavity Effects In Organic Semiconductors," A. Dodabalapur, et al., Appl. Phys. Lett. 64(19), 9 May 1994, pp. 2486–2488.

"Electroluminescence of Doped Organic Thin Films, " C.W. Tang, et al., J. Appl. Phys. 65(9), 1 May 1989, pp. 3610–3616.

"Visible Light Emission From Semiconducting Polymer Diodes," D. Braun, et al., Appl. Phys. Lett. 58(18), 6 May 1991, pp. 1982–1984.

*Primary Examiner*—Ashok Patel

*Attorney, Agent, or Firm*—Collier, Shannon, Rill & Scott, PLLC

[57] ABSTRACT

A light emission device including (i) a light emitting organic material, i.e., an organic material which in response to an applied voltage thereon emits light in the visible spectrum; (ii) an array of emitter tip elements in contact with the light emitting organic material; (iii) the first conductor coupled to the emitter tip elements in the array to stimulate emission of electrons from the emitter tip elements when the first conductor is connected to a power supply; (iv) a second conductor contacting the organic material and in depart relationship to the array of emitter tip elements, the second conductor being arranged in relation to the first conductor, to impose an applied voltage on the organic material when the first conductor is connected to the power supply, and electrons are emitted from the emitter tip elements into the light emitting organic material. The light emission devices of the invention may be employed in applications such as electroluminiscent lamps, liquid crystal technologies, field emitter devices, micro-cathode ray tubes, light emitting diode particles, and the like.

12 Claims, 1 Drawing Sheet

LIGHT EMISSION DEVICE COMPRISING LIGHT EMITTING ORGANIC MATERIAL AND ELECTRON INJECTION ENHANCEMENT STRUCTURE

CROSS-REFERENCE TO RELATED APPLICATION

The priority of U.S. Provisional patent application Ser. No. 60/004560 filed Sep. 29, 1995 is hereby claimed.

BACKGROUND OF THE INVENTION

1. Field of the Invention

This invention relates to a light emission device comprising a light-emitting organic material, e.g., in the form of a thin film, as the light emitting element, and a structure for enhancement of electron injection into such light-emitting organic material.

2. Description of the Related Art

In the field of color emissive displays, there is an ongoing search for improved light emission structures. The art includes electroluminescent lamps, liquid crystal technologies, field emitter devices, micro-CRTs, light emitting diode articles, and the like.

One nascent technology in this field involves electroluminescent organic materials which are radiantly emissive of light under applied voltages. Such materials may be variously doped to provide blue to red light at relatively low applied voltage conditions, but have generally been of low efficiency and brightness characteristics, deficiencies which are attributable to the limited ability of such organic materials to transport charge carriers in the illumination mode.

The art includes the following articles of the relevant technical literature: "Microcavity effects in organic semiconductors," A. Dodabalapur, et al., Appl. Phys. Lett. 64(19), 9 May 1994, pp. 2486–2488; "Electroluminescence of doped organic thin films," C. W. Tang, et al., J. Appl. Phys. 65(9), 1 May 1989, pp. 3610–3616; and "Visible light emission from semiconducting polymer diodes," D. Braun, et al., Appl. Phys. Lett. 58(18), 6 May 1991, pp. 1982–1984.

The present invention contemplates the improvement of organic light emissive material-based devices, permitting higher power efficiency and increased brightness, by an enhancement structure which is readily employable for the simple and economic fabrication of light-emissive structural articles.

SUMMARY OF THE PRESENT INVENTION

The invention in a broad aspect relates to the use of electron injection enhancement structures for injecting electrons into light emissive/organic materials to enhance the concentration of charge carriers in the organic material, and thereby enhance the brightness, and improve the illumination efficiency of the organic material, relative to corresponding organic material devices lacking the electron injection enhancement structure of the present invention.

In one embodiment, the invention comprises a light emission device including: (i) a light emitting organic material, i.e., an organic material which in response to an applied voltage thereon emits light in the visible spectrum; (ii) an array of emitter tip elements in contact with the light emitting organic material; (iii) a first conductor coupled to the emitter tip elements in the array to stimulate emission of electrons from the emitter tip elements when the first conductor is connected to a power supply; and (iv) a second conductor contacting the organic material and in spaced apart relationship to the array of emitter tip elements, the second conductor being arranged in relation to the first conductor, to impose an applied voltage on the organic material when the first conductor is connected to the power supply, and electrons are emitted from the emitter tip elements into the light emitting organic material.

As used herein, the term "emitter tip elements" refers to structural elements which protrude into the organic material and are constructed and arranged to emit electrons from the tip portions thereof, under applied voltage conditions. Any of a wide variety of geometric shapes and dimensions may be employed for the emitter tip elements, the structure, shape and characteristics of such elements being well known to those in the art of field emission devices and displays. Preferably, the emitter tip elements are of generally conical shape, although columnar elements having convergently shaped tips are also highly advantageous and other suitable geometries are likewise potentially useful in the broad practice of the invention.

Various other aspects, features, modifications, and embodiments are contemplated within the scope of the invention, including the illustrative embodiments disclosed more fully hereinafter.

DESCRIPTION OF THE INVENTION AND PREFERRED EMBODIMENTS AND ASPECTS THEREOF

The present invention is based on the discovery that use of field emitter device structures, particularly when fabricated of a low work function emitter material, can be used to significantly improve the efficiency of electron injection into organic light emitting materials.

The use of high density emitter tip elements in the form of a multiplicity of pointed structures, optionally in combination with a low work function material on the emitter tip or employed as a material of construction of the emitter tip elements, allows for more chemically stable light emissive organic materials to be used in the light emissive device, which results in higher brightness and better reliability in such device.

A point or tip structure is employed in the invention to concentrate the electric field to assist electron injection and increases the injection surface area. A low work function material may be advantageously employed for fabrication or coating of the emitter tip in the electron injection elements. Although any suitable low work function material may be advantageously employed, e.g., any useful low work function cermet material, a particularly useful material comprise a mixture of SiO and chromium, particularly a mixture of SiO and from about 50% to about 80% by weight chromium, based on the weight of the SiO in the composition. An illustrative composition of such type comprises SiO+50% Cr, wherein the percent chromium is on the same SiO weight basis.

This emitter tip structure can be fabricated using a high density dot or line patterning technique such as laser interference lithography, to create a high density array of nanodots or holes.

Figure 1:
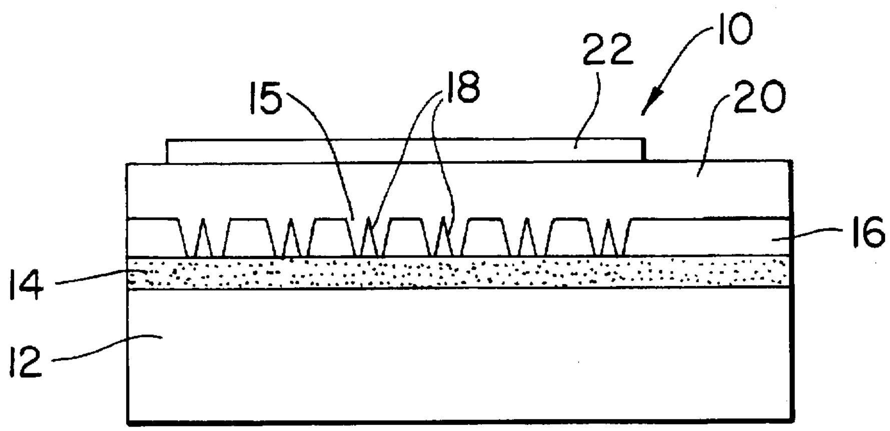
FIG. 1 is a schematic side elevational section view of a light emitting device according to one embodiment of the present invention.

FIG. 1 is a schematic side elevational section view of a light emitting device 10 according to one embodiment of the present invention. The device 10 comprises a substrate 12 which may for formed for example of glass, Mylar, ceramic or any other suitable material. On the substrate 12 is a conductor layer 14, which may be formed of conductive metal such as aluminum, silver, chromium, etc. The conductor layer 14 is coupled in electron emission-stimulating relationship with the array of emitter elements 18 so that when the conductor layer 14 is energized, via circuit forming connection with a power source, the emitter elements 18 arrayed across the surface in the device will emit electrons at the upper tip extremities. The emitter elements in the array are arranged in holes or wells 15 defined by an insulator layer 16, which may be formed for example of SiO, $SiO_2$, polymide, or other suitable insulation material.

Overlying the insulator/emitter element array portion of the device is a layer 20 of light emissive organic material which may for example comprise: hydroxyquinoline aluminum; poly(phenylene vinylene); poly(2-methoxy, 5-(2'-ethyl-hexoxy)-1, 4-phenylene-vinylene); lanthanide-containing organic polymers, etc., optionally with a hole-transport layer of a suitable material such as an aromatic diamine, and with the organic material being doped or undoped in character. Doping may be employed to provide specific spectral emission characteristics, such as particular fluorescence behavior, or light emission of red, green, blue, or other color. Dopants of various types useful for such purpose are known in the art, e.g., coumarin, Europium, silver, etc.

A second (top) conductor 22 is provided on the upper surface of the organic material 20, and with the first conductor 14 may be coupled with a suitable power supply (not shown) to impose on the organic material and on the emitter element array a voltage potential of suitable magnitude to yield light emission from the organic material 20 with emission of electrons from the emitter tip elements into the organic material for enhancement of the charge carrier density therein, and resultingly for improvement of the intensity and efficiency of the overall device, relative to corresponding devices lacking the field emitter element array enhancement feature of the present invention. The top conductor layer may be formed of indium tin oxide (ITO) or other suitable material.

The height of the emitter elements in the structure shown in FIG. 1 may for example be on the order of about 5 nm to about 200 nm, with 100 nm height emitter elements being typically employed. Nonetheless, it is to be recognized that the dimensions, size and shape of the emitter elements may be varied widely within the broad practice of the invention, the specific physical characteristics being dependent on the specific device and application involved, as readily determinable for good performance without undue experimentation. The thickness of the organic material measured from the tip of the emitter elements (or upper surface of the surrounding insulator layer 16) to the surface on which the second (top) conductor is disposed, may for example be on the order of from about 1000 Angstroms to about 10,000 Angstroms, or of any other suitable thickness.

Concerning the emitter tip elements in further detail, such elements may as mentioned herein be of any appropriate shape and size, but most preferably such elements are of generally conical shape, having as sharp a tip as is possible with the fabrication techniques employed. For such emitter elements of conical shape, the radius of curvature of the tip is desirably less than 500 Angstroms, preferably less than about 200 Angstroms, and most preferably less than about 100 Angstroms. Emitter tip elements having a tip radius of curvature on the order of 50 Angstroms or less are particularly advantageous in the practice of the invention.

In fabrication of the FIG. 1 structure, an insulating layer 16 (e.g., of silicon dioxide or polymide) may be deposited on the substrate 12, followed by the forming thereon of a top pattern mask of suitable material such as photoresist with holes patterned into the mask (e.g., utilizing steppers or laser interference patterning). Emitter material is then deposited into the holes until they close off using an evaporator. The excess deposited emitter material can then be lifted away (e.g., with 20% KOH solution or hot NMP with ultrasonic exposure) leaving the point structures. Other methods for forming such pointed structures with, or without the insulating surrounding layer, are known and within the skill of the art of fabricating field emitter microstructures. Optional coating of the emitter element, or selected surface portions thereof, with a low work function material may also be carried out.

Figure 2:
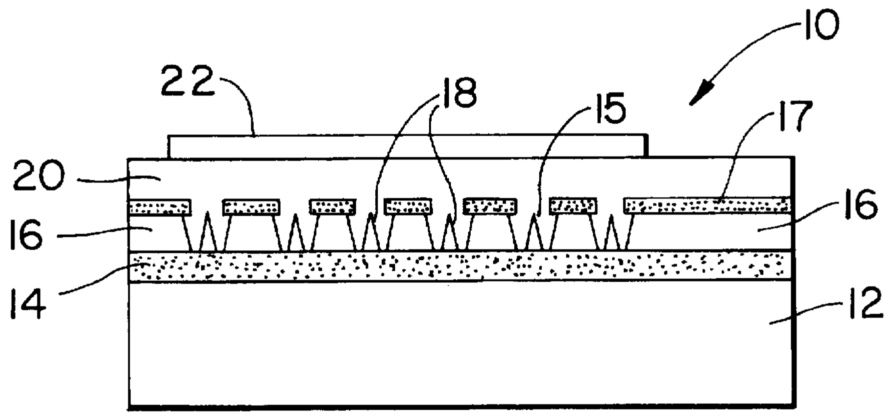
FIG. 2 is a schematic side elevational section view of a light emitting device according to another embodiment of the present invention.

If a separate gate metal layer 17 is employed, as in the FIG. 2 embodiment, a triode type device can be built. In FIG. 2, all corresponding parts and elements are numbered correspondingly to FIG. 1. The gate layer may be formed of a metal such as chromium, magnesium-silver alloy, aluminum, or gold (with a chromium underlayer, so that the gold layer does not readily delaminate in the structure), and such gate layer may for example be on the order of 100 nm in thickness. The emitter elements may be formed of a material such as the aforementioned SiO and chromium mixtures, e.g., SiO+50% Cr, or emitter elements may be formed of silicon and coated with a diamond-like carbon coating.

Groups of points, rough areas, ridges, or a single point emitter element may be used in each light element of a video display or light source.

Figure 3:
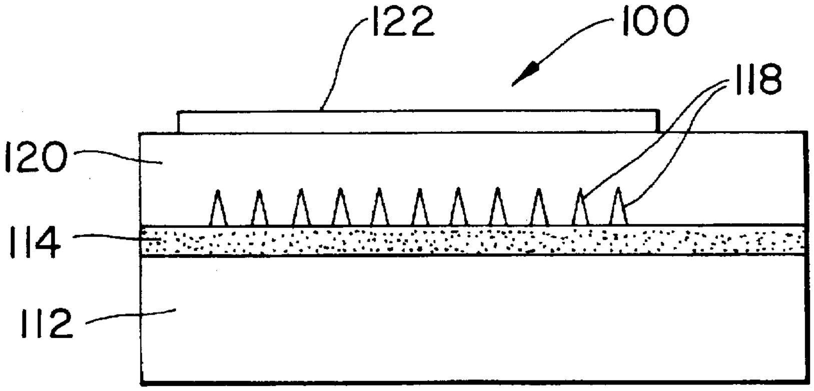
FIG. 3 is a schematic side elevational section view of a light emitting device according to a still further embodiment of the present invention.

FIG. 3 is a schematic side elevational section view of a light emitting device 100 according to a still further embodiment of the present invention, comprising substrate 112, conductor-reflector layer 114, emitter elements 118, organic light emissive material 120, and top conductor 122, wherein the materials of construction may for example be those illustratively discussed hereinabove, in connection with the FIG. 1 embodiment.

The FIG. 3 structure can be formed by etching away the insulating layer 16 (see FIGS. 1 and 2), or using alternate approaches within the skill of the art.

Accordingly, the invention contemplates within its broad scope: the use of pointed or sharp edge field emitter-like structures to increase current injection into light emitting organic polymers for enhanced light emission; the use of emitter elements with minor surface roughness to cream a larger injection area and/or small points; the use of Cr—SiO and other cermets for electron injectors into polymers; a gated emitter triode type structure where the gate to emitter voltage is used to control the level of injection with primary charge flow between the emitter or gate and top conductor, as well as a similar device without a top conductor (i.e., with primary charge flow between the gate and emitter); and the use of low work function material-coated electron injection structures (e.g., Ag, Mg, and diamond-like carbon).

While the invention has been described herein, with reference to various illustrative features, aspects, and embodiments, it will be recognized that the invention is susceptible of numerous variations, modifications and other embodiments, and the invention therefore is to be broadly construed, as encompassing all such variations, modifications and alternative embodiments, within its spirit and scope.

I claim:

1. A light emission device, comprising:

(i) a light emitting organic material;

(ii) an array of emitter tip elements in contact with the light emitting organic material;

(iii) a first conductor coupled to the emitter tip elements in the array to stimulate emission of electrons from the emitter tip elements when the first conductor is connected to a power supply; and (iv) a second conductor contacting the organic material and in spaced apart relationship to the array of emitter tip elements, the second conductor being arranged in relation to the first conductor, to impose and apply voltage on the organic material when the first conductor is connected to the power supply, and electrons are emitted from the emitter tip elements into the light emitting organic material.

2. A light emission device according to claim 1, wherein the array of emitter tip elements comprises emitter tips fabricated from a low work function emitter material.

3. A light emission device according to claim 1, wherein the emitter tip elements comprise upwardly converging structures terminating in an upper pointed tip terminus.

4. A light emission device according to claim 1, wherein the emitter tip elements are coated with a low work function material thereon.

5. A light emission device according to claim 1, wherein the emitter tip elements are formed of a low work function cermet material.

6. A light emission device according to claim 1, wherein the emitter tip elements are formed of a material including SiO in mixture with from about 50% to about 80% by weight chromium, based on the weight of SiO.

7. A light emission device according to claim 1, wherein the light emitting organic material comprises a material selected from the group consisting of hydroxyquinoline aluminum; poly(phenylene vinylene); poly(2-methoxy,5-(2'-ethyl-hexoxy)-1 or phenylene vinylene); and lanthanide containing organic polymers.

8. A light emission device according to claim 7, further comprising a hole-transport layer.

9. A light emission device according to claim 1, wherein the light emitting organic material is doped.

10. A light emission device according to claim 9, wherein the light emitting organic material is doped with a dopant selected from the group consisting of coumerin, Europium and silver.

11. A light emission device according to claim 1, wherein the emitter tip elements are formed of a material comprising SiO and chromium.

12. A light emission device according to claim 1, wherein the emitter tip elements are formed of silicon and coated with a diamond-like carbon coating.

* * * * *